E. KEIDEL & F. SIEBER.
ELECTRICAL WINDING.
APPLICATION FILED DEC. 12, 1914.

1,159,228.

Patented Nov. 2, 1915.

Witnesses:

Inventors:
Eberhard Keidel,
Ferdinand Sieber,
by
Their Attorney.

UNITED STATES PATENT OFFICE.

EBERHARD KEIDEL, OF BERLIN, AND FERDINAND SIEBER, OF CHARLOTTENBURG, GERMANY, ASSIGNORS TO GENERAL ELECTRIC COMPANY, A CORPORATION OF NEW YORK.

ELECTRICAL WINDING.

1,159,228.

Specification of Letters Patent.　　Patented Nov. 2, 1915.

Application filed December 12, 1914.　Serial No. 876,876.

*To all whom it may concern:*

Be it known that we, EBERHARD KEIDEL, a subject of the Emperor of Germany, residing at Berlin, Germany, and FERDINAND SIEBER, a subject of the Emperor of Austria-Hungary, residing at Charlottenburg, Germany, have invented certain new and useful Improvements in Electrical Windings, of which the following is a specification.

Our invention relates to the so-called "zigzag" windings of generators, motors, transformers, choking coils, etc., which are employed for a number of purposes and in a number of connections: for stabilizing a polyphase neutral point, with three-phase four-wire systems, in non-inductive windings, etc.

The object of our invention is to arrange a winding of this general character adapted to have applied to it, or to supply, electromotive forces of different values, particularly electromotive forces of different values but of substantially similar phases, either simultaneously or at different times, without substantial impairment of its qualities as a "zigzag" winding. The general scheme of arranging the windings can be better explained after one particular arrangement is described in detail.

In the accompanying drawing and the following description is illustrated and described in detail a three-phase transformer embodying our invention.

Figure 1:
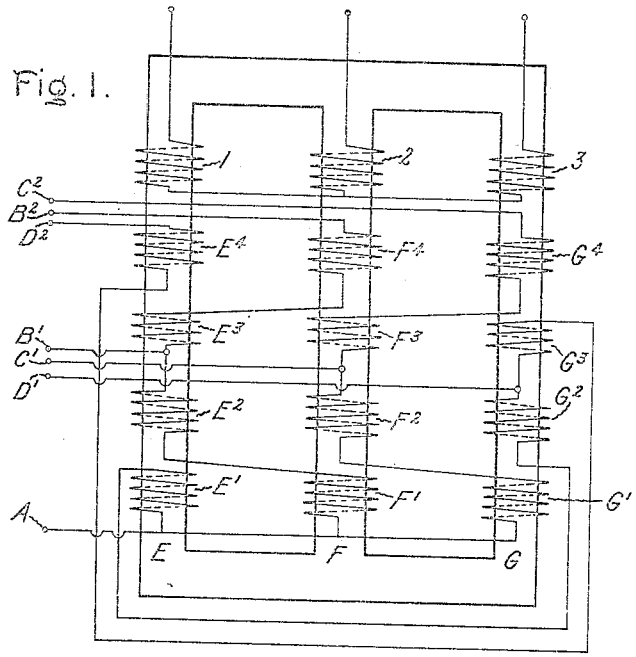
Figure 2:
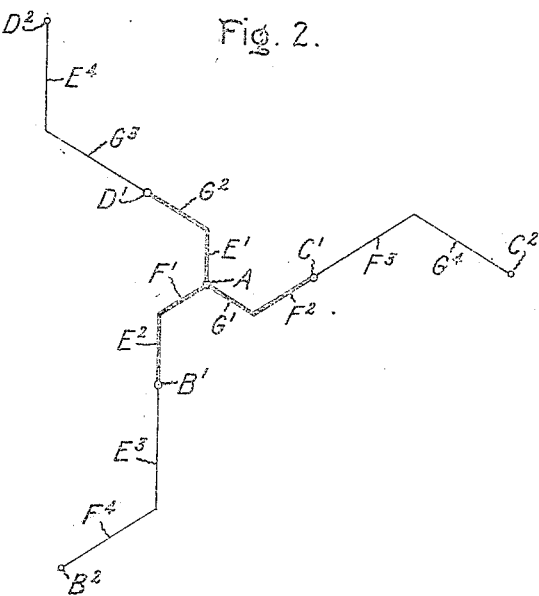

Figure 1 diagrammatically illustrates the three-phase transformer. Fig. 2 is a vector diagram to aid in understanding our inventions as embodied in three-phase apparatus. The secondary windings and their terminals of Fig. 1, and the vector diagram of Fig. 2 bear similar reference characters; Fig. 2 may be used as illustrating the connections of the secondary windings, the dispositions of the terminals and taps thereof, and the phase relations of the various electromotive forces.

The core of the three-phase transformer is of the common three-legged type; it carries the three windings 1, 2 and 3 which, it will be understood, may be either primary or secondary windings, but for the purpose of this description may be considered to be primary windings. These three windings are here connected in Y.

Now, whether the windings 1, 2 and 3 are employed as primary windings, or whether they are employed as secondary windings (or omitted altogether and the excitation of the core placed entirely under the control of the other windings later described), the legs E, F and G of the core will be excited by magnetic fluxes bearing a three-phase relation to each other so long as the apparatus is properly connected to a three-phase system as is presupposed. Each complete electrical phase comprises groups of windings arranged mutually inductively in assemblages with windings of other electrical phases so that each electrical phase comprises a group of windings subjected to each of a plurality of magnetic influences of different phases. Thus the electrical phase $D^2$, A, comprises the group $E^4$, $E^1$ disposed with the group $E^3$ and $E^2$ of phase $B^2$, A, on the leg E, and the group $G^3$, $G^2$ arranged with the group $G^4$ and $G^1$ of phase $C^2$, A, on the leg G. The windings of each electrical phase are connected in series in sets, each set being electrically, in effect, substantially like every other set of the same electrical phase. Thus of the electrical phase $D^2$, A, the windings $E^4$ and $G^3$ are connected in series to form the first set and the windings $G^2$ and $E^1$ are connected in series to form the second set; the two sets are connected in series by the connection between the windings $G^2$ and $G^3$. That these two sets are in effect substantially alike electrically may be readily realized from an inspection of Fig. 2.

The other electrical phases are similarly made up. Thus the electrical phase $C^2$, A, is made up of the windings $G^4$, $F^3$, $F^2$ and $G^1$, located on the legs F and G, and the electrical phase $B^2$, A, is made up of the windings $F^4$, $E^3$, $E^2$ and $F^1$ located on the legs E and F. The connections of the windings of each of these two electrical phases are similar, at least in effect, to the connection of the windings of the electrical phase $D^2$, A, as will be understood from reference to Fig. 2. The windings on each leg of the core constitute the respective assemblages heretofore mentioned. As it will be understood from the drawing, one end of each series connection of sets of windings is provided with a terminal $B^2$, $C^2$ or $D^2$, for connection to external lines or apparatus; the opposite ends of the series connections of sets of windings are connected together at A where another terminal may be provided for external connection. Between the two sets of windings of each electrical phase is located a tap $B^1$, $C^1$, $D^1$, for external connection.

It will be understood from this connection and readily seen from an inspection of Fig. 2, that this arrangement of windings is in effect a Y connection somewhat similar to, but an extension of, the heretofore common "zigzag" connection. It will be seen that the windings $E^4$ and $G^3$ are so arranged that they bear the same relation to each other in effect through the interlinked flux as the windings $G^2$ and $E^1$ bear to each other. Likewise, in each of the other electrical phases the members of the first set of windings bear the same relation to each other as do the members of the second set of windings. Also as a whole all the first sets of windings bear the same relations to each other through the interlinked flux as do the second sets to each other. As the result of this, the first sets of windings of all electrical phases may be removed from or inserted into the working circuits without destroying or substantially changing the general scheme of magnetic interlinkages with the various working circuits. Thus it will be seen that the electromotive force between A and $C^1$ is substantially in phase with the electromotive force between A and $C^2$; whether these phases are exactly or substantially the same and whether the electromotive force between A and $C^1$ is exactly or substantially one-half of the electromotive force between A and $C^2$ depends upon the relative numbers of turns in the various windings. The phases may be made to be exactly alike and the electromotive forces of definite fractions and multiples of the other by properly proportioning the windings as will be clear. Likewise, the phases of the electromotive forces may be only substantially alike and their values may bear only substantially those relations by using other relative numbers of turns of the windings.

The arrangement of the secondary windings described above is generally a preferable one for three-phase systems. The general scheme, as will be understood with the aid of the above detailed explanation of the three-phase scheme, consists in dividing up the windings of each electrical phase, and so interlinking all the windings of the various electrical phases by the magnetic flux produced either by those windings alone or aided by exciting windings, that sufficient of the windings of the various phases may be removed from, or included in circuit, by means of terminals and taps, to provide for the required voltages without destroying or substantially changing the general scheme of magnetic interlinkages with the various working circuits. Broadly this is accomplished by providing for the removal, or insertion, of not only substantially equal numbers of turns (or appropriate numbers of turns) of each electrical phase, but those turns are so arranged and chosen as to bear the same relation to each other, in effect, through the interlinked flux, as those turns unaffected by the change bear to each other. This is done preferably by arranging for a plurality of magnetic circuits carrying flux of different phases, subjecting a group of windings of each electrical phase to the effects of each of a plurality of such magnetic circuits, connecting the windings in Y in sets, each set of windings being complete in itself and in effect electrically like every other set of its electrical phase, and disposing the taps and terminals so as to cut only whole sets of the windings into or out of the circuits. The electrical similarity of the various sets of windings may be secured by various connections of the members of the sets. The number of members of each set of windings is immaterial and not necessarily two as illustrated; likewise the numbers of members of the various sets are not necessarily equal.

It will be understood that numerous changes may be made in the arrangements and connections of the windings without departing from the spirit of our invention.

What we claim as new and desire to secure by Letters Patent of the United States, is,—

1. An arrangement of windings of a three-phase system comprising four windings for each electrical phase arranged in assemblages of four windings, each assemblage comprising two windings of each of two electrical phases and the members of each assemblage being arranged in mutually inductive relation, the four windings of each electrical phase being connected in series so that the two windings adjacent one end of the series connection are members of different assemblages and one end of one such series connected group of four windings being connected to corresponding ends of all the other groups, a terminal at the opposite end of each series connected group of four windings and a tap connected to a mid point of each such group of windings.

2. An arrangement of windings of a three-phase system comprising four windings of each electrical phase arranged in assemblages of four windings, each assemblage comprising two windings of each of two electrical phases and the members of each assemblage being arranged in mutually inductive relation, the four windings of each electrical phase being connected in series and one end of one such series connected group of four windings being connected to corresponding ends of all the other groups, a terminal at the opposite end of each series connected group of four windings and a tap connected to a mid point of each such group of windings.

3. An arrangement of windings of a polyphase system comprising for each electrical phase a plurality of groups of windings, each group being assembled in mutually inductive relation to a group of windings of another phase, the windings for each electrical phase being connected in series in sets, each set comprising one winding from each of the groups of windings of that phase and the sets being connected in series, one end of one of the series connections of sets of windings being connected to corresponding ends of all the other similar series connections of sets, a terminal at the opposite end of each such series connection of sets and a tap to each of such series connections at a point therein adjacent a connection of two sets of windings thereof.

4. An arrangement of windings for a polyphase system comprising for each electrical phase a plurality of windings assembled in mutually inductive relation to windings of each of a plurality of other electrical phases, the windings for each electrical phase being connected in series, one end of one of the series connections of windings being connected to the corresponding ends of all the other similar series connections, a terminal at the opposite end of each series connection and a tap to each of such series connections at a mid point thereof.

5. An arrangement of windings of a polyphase system comprising for each electrical phase a plurality of groups of windings, each group being assembled in mutually inductive relation to a group of windings of another electrical phase, the windings for each electrical phase being connected in series and the series connections being connected in Y, a terminal at the free end of each series connection, and a tap at an inner point of each series connection, the windings between the taps and terminals being assembled to bear substantially the same relations to each other through the interlinked flux as do the windings between the taps and the common point of the Y.

In testimony whereof, we have hereunto set our hands this 19th day of October, 1914.

EBERHARD KEIDEL.
FERDINAND SIEBER.

Witnesses:
WOLDEMAR HAUPT,
HENRY HASPER.